(12) United States Patent
Ludwig et al.

(10) Patent No.: US 9,602,234 B2
(45) Date of Patent: Mar. 21, 2017

(54) DATA TRANSMISSION CONTROL METHODS AND DEVICES

(71) Applicant: TELEFONAKTIEBOLAGET L M ERICSSON (PUBL), Stockholm (SE)

(72) Inventors: Renier Ludwig, Hürtgenwald (DE); Daniel Enström, Gammelstad (SE); Ingemar Johansson, Lulea (SE); Tomas Hedberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/679,279

(22) Filed: Apr. 6, 2015

(65) Prior Publication Data
US 2015/0215067 A1    Jul. 30, 2015

Related U.S. Application Data

(63) Continuation of application No. 12/900,698, filed on Oct. 8, 2010, now Pat. No. 9,025,453, which is a continuation of application No. 12/678,208, filed as application No. PCT/EP2008/060939 on Aug. 21, 2008, now Pat. No. 8,787,156.

(30) Foreign Application Priority Data

Aug. 22, 2007  (EP) ..................................... 07016492
Oct. 8, 2007   (EP) ..................................... 07118035

(51) Int. Cl.
*H04L 12/801* (2013.01)
*H04L 1/00*   (2006.01)
(Continued)

(52) U.S. Cl.
CPC ............ *H04L 1/0002* (2013.01); *H04L 47/10* (2013.01); *H04L 47/11* (2013.01); *H04L 47/12* (2013.01);
(Continued)

(58) Field of Classification Search
None
See application file for complete search history.

(56) References Cited

U.S. PATENT DOCUMENTS 6,097,697 A     8/2000  Yao et al.
6,108,307 A *   8/2000  McConnell et al. .......... 370/235
(Continued)

FOREIGN PATENT DOCUMENTS

EP    1 067 729 A2    1/2001
EP    1 672 941 A1    6/2006
(Continued)

OTHER PUBLICATIONS

3rd Generation Partnership Project; Technical Specification Group Services and System Aspects; GPRS enhancements for E-UTRAN access (Release 8). 3GPP TS 23.401. v1.1.0 (Jul. 2007).

*Primary Examiner* — Rhonda Murphy (57) ABSTRACT

A method of controlling a receiver of a data unit communication from a data source is described, said receiver being associated with a first terminal of a data unit communication network providing said first terminal with a transport service characterized by a set of values associated with respective service quality parameters, said service quality parameters comprising a Guaranteed Bit Rate (GBR), said data source being associated with a second terminal. The method comprises determining, by the receiver, whether a received data unit contains an Explicit Congestion Notification (ECN). If said ECN is detected, the method further comprises sending, from the receiver, to said data source a message for adjusting a data transmission rate of said data source, said message indicating as an upper bound for said data transmission rate a value corresponding to a value associated with the GBR for said first transport service.

14 Claims, 7 Drawing Sheets

(51) Int. Cl.
*H04L 12/833* (2013.01)
*H04L 12/851* (2013.01)
*H04W 28/02* (2009.01)
*H04W 28/22* (2009.01)
*H04W 72/12* (2009.01)

(52) U.S. Cl.
CPC ............. *H04L 47/14* (2013.01); *H04L 47/24* (2013.01); *H04L 47/31* (2013.01); *H04W 28/02* (2013.01); *H04W 28/22* (2013.01); *H04W 72/1205* (2013.01)

(56) References Cited

U.S. PATENT DOCUMENTS

| | | |
|---|---|---|
| 7,855,958 B2 | 12/2010 | Wang |
| 7,913,014 B2 | 3/2011 | Sama |
| 7,961,616 B2 | 6/2011 | Jain et al. |
| 7,969,882 B2 | 6/2011 | Matsunaga |
| 8,942,243 B2 * | 1/2015 | Wanstedt ................ H04L 47/10 370/395.61 |
| 2002/0186657 A1 | 12/2002 | Jain |
| 2003/0026226 A1 | 2/2003 | Miura |
| 2004/0082364 A1 | 4/2004 | Kitazawa et al. |
| 2005/0003824 A1 | 1/2005 | Siris |
| 2005/0107091 A1 | 5/2005 | Vannithamby |
| 2005/0207359 A1 | 9/2005 | Hwang et al. |
| 2006/0126509 A1 | 6/2006 | Abi-Nassif |
| 2006/0176810 A1 | 8/2006 | Kekki |
| 2006/0291401 A1 | 12/2006 | Yuen et al. |

FOREIGN PATENT DOCUMENTS

| | | |
|---|---|---|
| WO | WO 2004/002049 A1 | 12/2003 |
| WO | WO 2007/091941 A1 | 8/2007 |

* cited by examiner

DATA TRANSMISSION CONTROL METHODS AND DEVICES

This application is a continuation application which claims the benefit of pending patent application Ser. No. 12/900,698, filed on Oct. 8, 2010, which was a continuation application of patent application Ser. No. 12/678,208 filed on Jun. 2, 2010, which was an application under 35 U.S.C. 371 of PCT/EP08/60939, filed on Aug. 21, 2008, which claims priority from EP 07016492.6, filed on Aug. 22, 2007, and EP 07118035.0, filed on Oct. 8, 2007, the disclosures of which are fully incorporated herein by reference.

BACKGROUND OF THE INVENTION

The present invention relates to methods and devices for controlling a data transmission over a data unit communication network using a specified transport service offered by the data unit communication network to a terminal.

BACKGROUND

In the field of data unit communications it is known to offer a specified transport service for the transmission of data units over a network. Such a transport service is constituted by associating certain values with service quality parameters of the transport service, e.g. assigning a value to a minimum transmission capacity parameter (sometimes also referred to as a guaranteed bit rate) and assigning a value to a maximum transmission capacity parameter (sometimes also referred to as a maximum bit rate). A data source associated with a terminal of the network providing the transport service can then be appropriately controlled on the basis of the values assigned to the service quality parameters.

An example of a transport service is a bearer allocated by a communication network for a data transmission of a given terminal of that network. An example of such a network is a mobile telephone network using GPRS, as e.g. can be taken from 3GPP specification TS23.401 describing the so-called evolved 3GPP Packet Switched Domain, which is also referred to as the evolved packet system (EPS). The evolved 3GPP packet switched domain provides IP connectivity using the evolved universal terrestrial radio access network (E-UTRAN).

Figure 2:
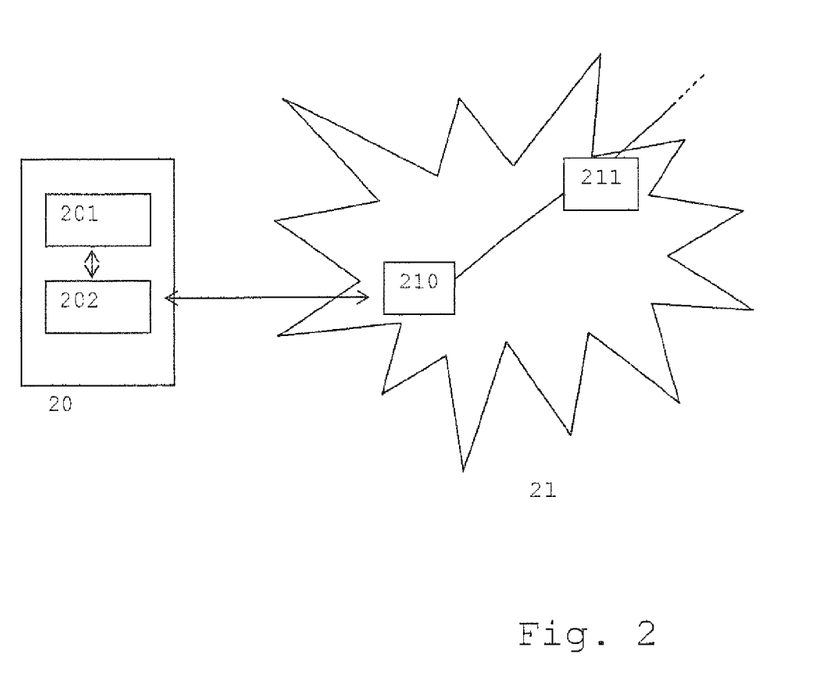
FIG. 2 shows another schematic block diagram of a communication arrangement and network.

FIG. 2 schematically shows a system comprising a communication arrangement 20 that contains a data source 201 and a terminal 202 that is part of a network 21, where communication can e.g. be conducted via an access node 210 (e.g. a base station) and a gateway node 211 towards further networks. The communication arrangement 20 can e.g. be a mobile telephone, where the data source 201 can e.g. be an application that generates data (e.g. video telephony) and the terminal 202 is the communication part arranged for executing data transmissions to and from the network 21. In other words, the data source 201 and the terminal 202 can be logically separate parts of a single physical unit, or they can also be physically separate parts.

It is noted that the term "data unit" is used generically in the context of the present specification and claims, and refers to any subdivision of data used for transporting a quantity of data, where such subdivisions carry different names depending on context and protocol, for example frame, packet, segment, protocol data unit, etc.

It is furthermore known that data sources can be rate adaptive, i.e. can adjust their data rate variably. For example, the sending data rate of a data source can be adapted by varying the source encoding rate of a data encoder, such as a speech encoder or video encoder.

In such systems, there exists the basic problem of providing the network with a means for controlling the data rate of the rate adaptive source.

OBJECT

The object of the present invention is to provide improved concepts of data unit communication, especially in view of the above-mentioned problem.

SUMMARY

The object is solved by the subject-matter of the independent claims. Advantageous embodiments are described in the dependent claims.

According to embodiments of the present invention, a control operation on the part of the network for influencing the data rate of a data source is done with the help of setting a congestion indication marking in data units being sent from a data source to a receiver. The receiver then sends an appropriate control message to the data source. Such a congestion indication marking can e.g. be an Explicit Congestion Notification in an IP header of said data units. Using congestion indication markings has the advantage of simplicity over procedures for directly signalling from a network entity to a data source. Especially, the network entities performing the control operation do not need to have any knowledge of the specifics of the data source and its rate adaptation mechanism. Rather, the actual rate adaptation is done at the application layer at which the data source and receiver reside, and the network entities at lower layers only provide input in the form of a generic congestion indication. In this way the rate reduction scheme at the communication end points is agnostic to the underlying network technology, which makes it applicable to all kinds of different network technologies (both 3GPP access systems and non-3GPP access systems), while the scheme for adding congestion indication markings at the access network level can be agnostic to the specifics of the rate adaptivity in the data source, i.e. requires no knowledge of the source codecs or of the transport layer specifics, and can therefore be used with either real-time transport protocols like UDP (User Datagram Protocol) or reliable transport protocols like TCP (Transmission Control Protocol). In summary this leads to a very flexible but at the same time also simple system for letting the network influence the sending rate of a data source.

According to a first aspect, the invention can be embodied as a method of controlling a radio access network entity of a data unit communication network and as a corresponding radio access network entity, said radio access network entity being involved in providing a transport service to a radio terminal of said data unit communication network, said transport service being characterized by a set of values associated with respective service quality parameters, said method comprising:
  monitoring a communication quality at the radio access level of a communication between said terminal and an access point of said radio access network, and
  setting a congestion indication marking in data units of said transport service if said communication quality fulfils a radio communication degradation condition.

In this aspect, a radio access network entity marks data units based on the radio communication quality between the terminal and the radio access point, e.g. a base station. The radio access network entity performing the marking may be located at the radio access point or further on the network communication path. The quality can be determined based on one or more of e.g. the signal strength, on the bit error rate or on dedicated quality indicators such as Channel Quality Indicators (CQI). The quality can be determined in the uplink or downlink direction, where it is preferable that at least the uplink quality is observed. As a consequence, the radio access entity can operate to reduce the sending rate of the data source with a simple feedback mechanism (congestion indication marking) if it determines that the radio communication quality has been degraded below a given level, such that the data source does not experience an uncontrolled loss of transmission quality if it sends at a rate that the radio link can not or soon will not be able to support. It is noted that the radio communication degradation condition can be chosen in such a way that it reflects a quality level before communication problems occur, in order to warn of an upcoming problem.

According to a second aspect, the invention can be embodied as a method for controlling a receiver of a data unit communication from a data source and as a corresponding receiving device, said receiver being associated with a terminal of a data unit communication network providing said terminal with a transport service characterized by a set of values associated with respective service quality parameters, said service quality parameters comprising a minimum transmission capacity parameter, said method comprising:

determining whether a received data unit contains a congestion indication marking, if said congestion indication marking is detected, sending to said data source a message for adjusting a data transmission rate of said data source, said message indicating as an upper bound for said data transmission rate a value corresponding to a value associated with the minimum transmission capacity parameter for said transport service.

In this aspect, if the receiver of the communication detects the presence of feedback from the network that indicates that the data source should reduce its rate, namely the presence of the congestion indication marking, it instructs the data source to reduce its rate and at the same time gives an upper bound value that depends on the minimum transmission capacity associated with the transport service provided to the receiver. For example, if the minimum transmission capacity is a guaranteed bit rate, then the receiver can indicate to the data source that its sending bit rate should not exceed the value of the guaranteed bit rate associated with the transport service offered to the terminal associated with the receiver. In this way, improved control can be achieved, as the data source not only receives an indication to reduce its sending rate, but furthermore obtains dedicated knowledge of an upper bound.

According to a third aspect, the invention can be embodied as a method of controlling a data source of a data unit communication to a receiver and to a corresponding data source device, said data source being associated with a terminal of a data unit communication network providing said terminal with a transport service characterized by a set of values associated with respective service quality parameters, said service quality parameters comprising a minimum transmission capacity parameter, said method comprising:

determining whether a message for adjusting a data transmission rate of said data source has been received from said receiver, if said message is received, adjusting the transmission rate of said data source based on an upper bound for said data transmission rate indicated in said message and a value corresponding to a value associated with the minimum transmission capacity parameter for said transport service.

In this aspect, which may correspond to the receiver of the second aspect, the data source can take into account not only an upper bound for the sending rate communicated in the message (which may be a value associated with the minimum transmission capacity parameter offered to the receiver, but could also be another upper bound chosen by the receiver), but also the value of the minimum transmission capacity parameter associated with the transport service offered to its own terminal. For example, if the minimum transmission capacity is a guaranteed bit rate, then the message might indicate the guaranteed bit rate value offered to the receiver, and the data source can then reduce its sending rate to the lower value out of the guaranteed bit rate value offered the data source and the guaranteed bit rate offered to the receiver.

According to a fourth aspect, the invention can be embodied as a method of controlling a network entity of a data unit communication network and as a corresponding network entity, said network entity being involved in providing respective transport services to a plurality of terminals of said data unit communication network, each transport service being characterized by a set of values associated with respective service quality parameters, said method comprising:

monitoring for a presence of a collective feedback condition, and if the presence of said collective feedback condition is determined, setting a congestion indication marking in data units of a defined group of said transport services.

In this aspect, a network entity (e.g. a radio access network entity) can perform a collective feedback operation by setting a congestion indication marking in data units belonging to a defined group of transport services. Thereby a rate reduction can be achieved for a plurality of data sources in the event of a congestion condition. It is noted that the association of data units and transport services can be done in any suitable or desirable way, e.g. based on address information (e.g. IP addresses and port numbers) in the data units that identify a particular transport service, e.g. a particular bearer.

BRIEF DESCRIPTION OF FIGURES

Now detailed examples of the invention will be described with reference to the drawings, in which.

DETAILED DESCRIPTION

In the following, detailed examples of the invention will be described. It is noted that reference will be made to specific technologies and standards, such as GPRS (General Packet Radio Service) or 3GPP TS23.401, but such references only serve to indicate preferred examples and are in no way limiting. Rather, the present invention can be generally applied in the context of any communication system that provides for the use of specified transport services (such as bearers) that are characterised by at least a parameter indicating a minimum transmission capacity and where a data source associated with a terminal can adjust its transmission rate. However, it is noted that EPS systems are a preferred application of the invention.

A transport service within the meaning of the present specification and claims is a service offered to a terminal for transporting data units. The transport service is characterized by a set of values associated with respective service quality parameters, e.g. values associated with a guaranteed bit rate parameter and a maximum bit rate parameter. The service can comprise many individual parts for transporting data, such as various links and channels. An overall transport service from a terminal to a gateway of a network can comprise a number of sub-services, as e.g. an Evolved Packet System (EPS) bearer can comprise a concatenation of a number of sub-bearers, such as a radio bearer, an S1 bearer and a S5/S8 bearer. An EPS bearer or a radio bearer is an example of a transport service.

Service quality parameters for such a transport service (e.g. a bearer) can be one or more of the Guaranteed Bit Rate (GBR), Maximum Bit Rate (MBR), a Label and an Allocation and Retention Priority (ARP). The Label is a scalar that is used as a reference to access node-specific parameters that control bearer level packet forwarding treatment and that have been pre-configured by the operator owning the access node. The value of ARP indicates a priority of allocation and retention, i.e. serves as an element in a decision on whether a bearer establishment/modification request can be accepted or needs to be rejected in case of resource limitations. The value of ARP can also be used to decide which bearers to drop during exceptional resource limitation (e.g. at handover). GBR, MBR, Label and ARP are e.g. known form 3GPP TS 23.401.

It is noted that in the context of TS 23.401 so-called GBR bearers and so-called non-GBR bearers are known. In a GBR bearer a value of GBR is allocated, whereas in a non-GBR bearer no such value is explicitly set. However, even in a non-GBR bearer a minimum transmission capacity can be assumed, namely a value of zero. In this way, the presently described concepts relating to minimum transmission capacity values can be applied to both GBR and non-GBR bearers.

The transmission capacity indicates an amount of data that can be sent within a given period of time. It can be expressed in any suitable way, e.g. as a bit rate or byte rate. In the following, the transmission capacity will generally be exemplified as a bit rate.

It is furthermore noted that within the context of the present specification and claims the term "minimum transmission capacity" or "guaranteed bit rate" does not mean that such a transmission capacity or bit rate is always provided to the terminal. For example, if the terminal is a radio terminal (e.g. part of a mobile phone), then there can be periods of complete communication interruption due to environmental circumstances. Nonetheless, the network will always control its resources in such a way that the minimum or guaranteed bit rate is provided for the transport service to the terminal under all conditions that are under its control. In other words, the "minimum" or "guaranteed" transmission capacity indicates the assignment of a desired quality for the transport service, i.e. a service quality parameter characterizing the transport service is set to this value, and the network will be controlled to provide this quality to the transport service if it is in any way possible. In other words, the network will do everything such that the resources under its control are appropriately set, but it can naturally not guarantee for conditions that are not under its control (e.g. a mobile phone entering an area of non-coverage, such as a tunnel).

Figure 1:
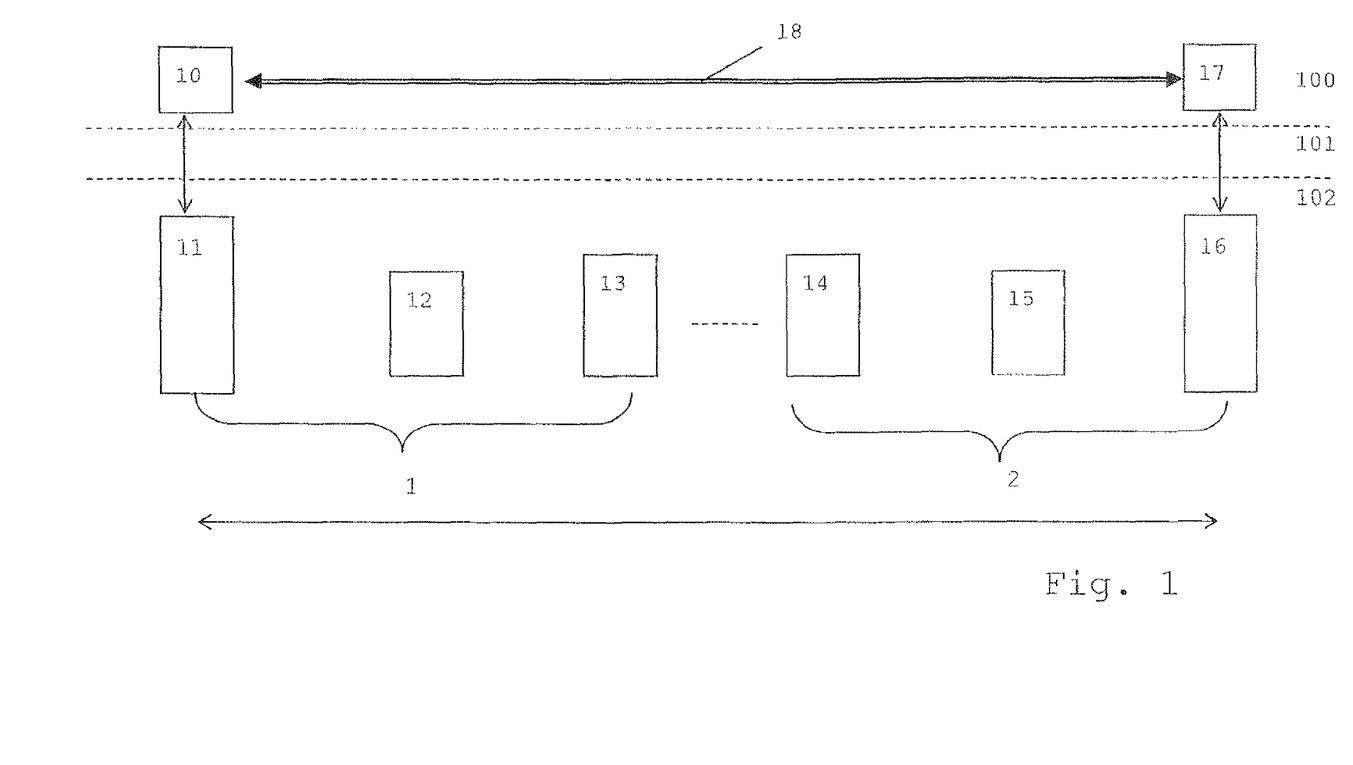
FIG. 1 shows a schematic block diagram of a network comprising entities operating in accordance with aspects of the present invention.

FIG. 1 shows a schematic representation of a system to which aspects of the invention can be applied. 10 represents a data source, e.g. an application running on an application layer 100 that generates data for transmission. Such an application can e.g. be an audio and/or video coder running on a mobile telephone. The data source 10 has an adjustable data sending rate. On the application layer 100 the data source 10 communicates in a peer-to-peer communication 18 with a receiver 17, e.g. an audio and/or video receiving application running on another mobile telephone.

The data source is associated with a terminal 11 that belongs to a data unit communication network 1, e.g. a GPRS network. The data source 10 and terminal 11 may be comprised within a single physical unit, e.g. a mobile telephone, or they may be physically separate parts. Data is passed from the application layer 100 over a network/transport layer 101 down to the layer 102 of the transport service provided at the link layer and below.

12 represents an entity of a radio access network of network 1, e.g. a base station, a base station controller, a radio network controller or an eNodeB. 13 represents a gateway entity towards another network, e.g. a serving gateway. Network 1 provides a transport service to terminal 11 for transporting data units from data source 10. The transport service has associated with its service quality parameters specific values, e.g. a given value for the minimum transmission capacity and a given value for the maximum transmission capacity. The entities 12 and 13 are involved in the providing of the transport service, e.g. an EPS bearer.

The term entity refers to one or more nodes that together provide a predetermined functionality.

The structure on the side of the receiver 17 is similar, i.e. receiver 17 is associated with a terminal 16 of another network 2 that furthermore comprises an access network entity 15 and a gateway entity 14 involved in providing a transport service to the terminal 17. The communication between the data source 10 and receiver 17 is carried over gateway entities 13 and 14, where there may or may not be further intervening networks. Also, it is noted that networks 1 and 2 will comprise further nodes that may or may not be involved in the communication, but which are not shown because they are known to the skilled person and are not relevant for the invention.

It is also noted that each network may also provide more than one independent transport service to each terminal in parallel, as it is e.g. known to provide several bearers for a terminal. Those aspects of the invention described with respect to one transport service can equally be applied to a plurality.

Figure 3:
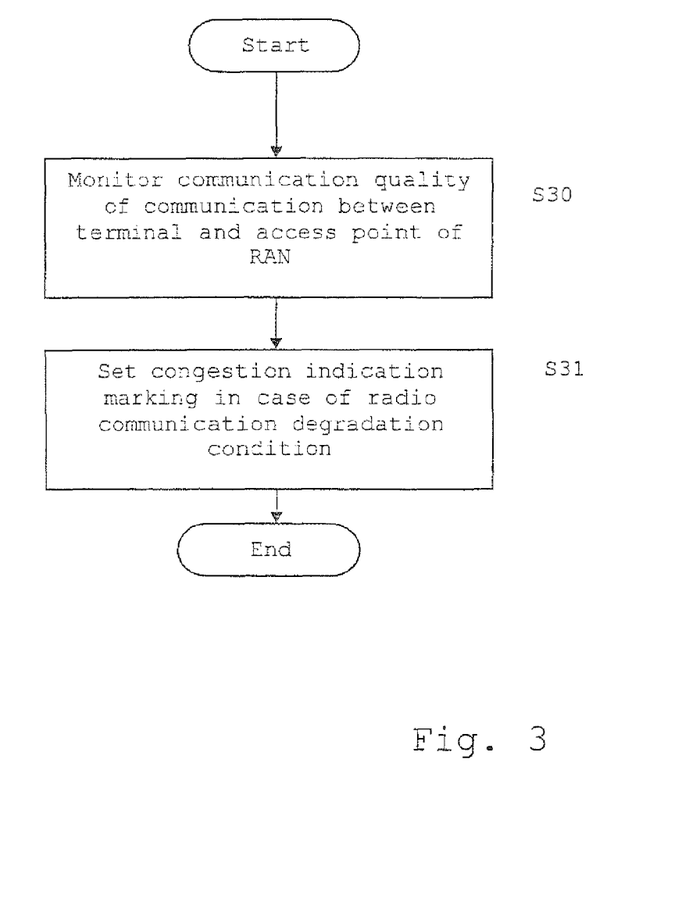
FIG. 3 shows a flowchart of a method embodiment of the invention.

FIG. 3 shows a method embodiment for controlling radio access network entity 12. The method comprises monitoring a communication quality at the radio access level of the communication between terminal 12 and an access point of the radio access network, e.g. a base station, see step S30, and setting a congestion indication marking in data units of the transport service if the communication quality fulfils a radio communication degradation condition, see step S31.

The congestion indication markings can be chosen in any suitable or desirable way, e.g. they can be Explicit Congestion Notification (ECN) markings if the data units comprise IP packets, and an Explicit Congestion Notification can be set in the IP header of the data units. ECN is arranged such that two bits in the IP header have been allocated for use with this function. A source that is ECN capable can indicate this with one of two values "01" or "10". If the source is not ECN capable, those bits are set to "00". If the network entity of the present embodiment uses ECN as a means of congestion indication marking, it will reset the ECN bits in the IP header to "11" if a radio communication degradation condition is detected.

The communication quality can be determined based on one or more of e.g. the signal strength, on the bit error rate or on dedicated quality indicators such as Channel Quality Indicators (CQI). The quality can be determined in the uplink or downlink direction, where it is preferable that at least the uplink quality is observed.

In known uses of congestion indication markings, like with ECN, such markings are added if a congestion condition is detected. Such a congestion condition is determined based on the state of congestion at a forwarding point, e.g. at a router. The state of congestion is typically assessed based on the queue state at the forwarding point, e.g. based on the length of the data unit queue waiting to be forwarded. In contrast thereto, the present embodiment of the invention monitors the communication quality at the radio access level and makes a setting of a congestion indication marking dependent on the presence of a radio communication degradation condition. Therefore, instead of looking at a congestion condition at the level of data unit handling, the present embodiment considers the situation of the radio communication. Thereby, the embodiment applies congestion indication markings in a completely new context.

In the embodiment of FIG. 3, the marking is triggered by the presence of a radio communication degradation condition. Such a degradation in radio communication can e.g. be due to the mobile device becoming coverage limited, i.e. it moving into an area in which radio communication becomes worse, for example at a cell edge. The marking can additionally also be triggered by the occurrence of further conditions. For example, if the data unit communication network is a cellular network, the method may comprise setting a congestion indication marking in the data units of the transport service if a cell-level congestion condition is present. Other examples of such further conditions are a reduced capability condition for a hand-over target (e.g. a transport service or bearer to which the terminal is to be handed over is congested or has a lower transport capability) and a transport network level congestion condition.

The above described methods can also be embodied as software comprising computer program code parts arranged to perform the method steps when executed on a network entity, and as a computer program product carrying such a computer program, e.g. a data carrier.

Figure 7:
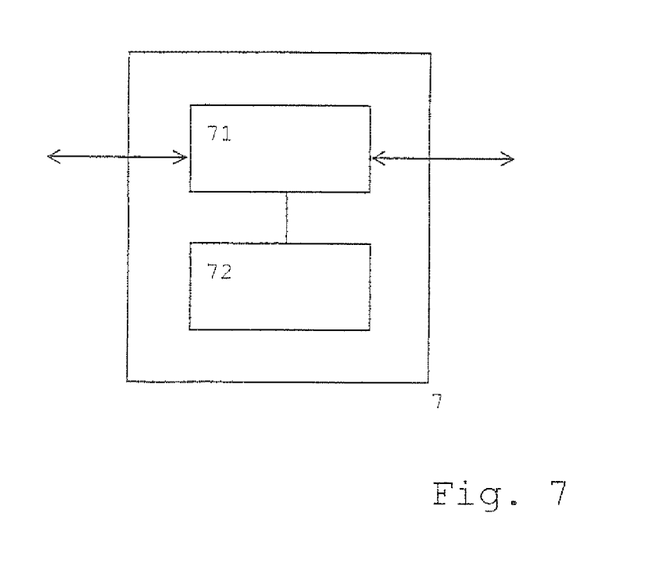
FIG. 7 shows a schematic representation of a network entity.

Furthermore, the invention also can be embodied as a radio access network entity for a data unit communication network, like entity 12 shown in FIG. 1, where said radio access network entity is arranged to be involved in providing a transport service to a radio terminal of said data unit communication network, said transport service being characterized by a set of values associated with respective service quality parameters, said radio access network entity comprising a control element (e.g. a programmable processor) arranged for monitoring a communication quality at the radio access level of a communication between said terminal and an access point of said radio access network, and for setting a congestion indication marking in data units of said transport service if said communication quality fulfils a radio communication degradation condition. FIG. 7 shows a schematic example of a network node 7 acting as such a network entity, where 71 represents a buffer for receiving and holding data units and 72 represents a processor appropriately programmed to implement the above methods. Further known elements of network nodes are not shown for simplicity.

The above described network entity and corresponding control method are arranged to operate together with a data source and a receiver that are capable of responding to the congestion indication markings in data units. In principle, the data source and receiver can be arranged in any suitable way, e.g. if the network entity of the above described embodiment uses ECN markings, then the data source and receiver may be standard ECN compatible.

Figure 4:
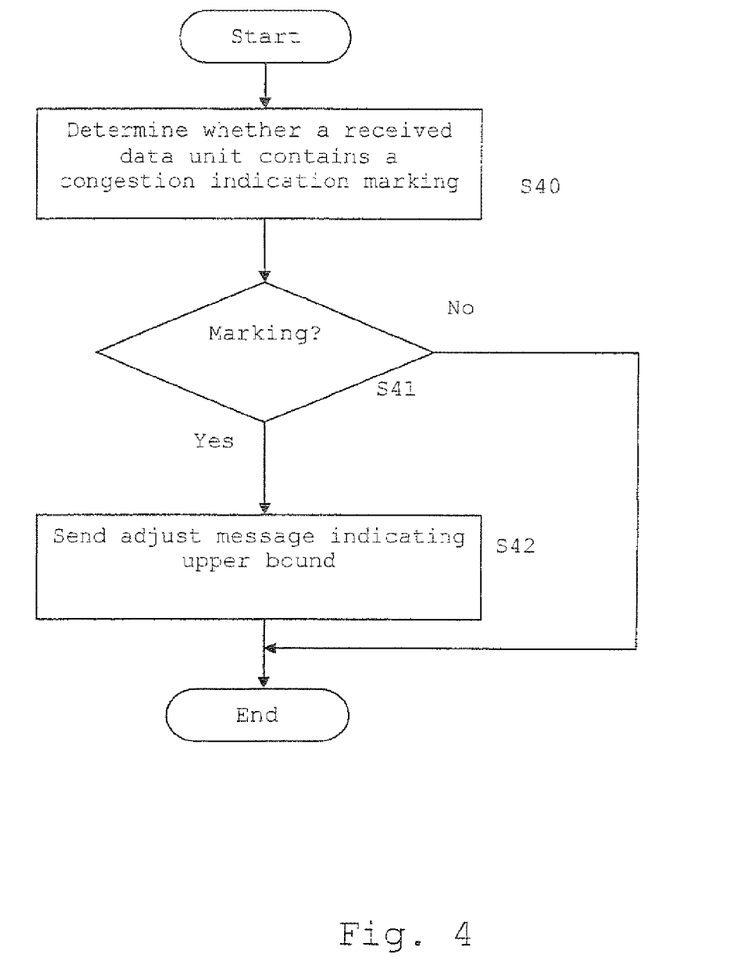
FIG. 4 shows a flowchart of another method embodiment of the invention.

Preferably, however, the receiver and corresponding control method are adapted to take into account a minimum transmission capacity offered by the network to the receiver. FIG. 4 shows such a method for controlling a receiver such as receiver 17 shown in FIG. 1. The method for controlling the receiver 17 of a data unit communication 18 from the data source 10 comprises determining whether a received data unit contains a congestion indication marking, step S40, and if said congestion indication marking is detected, step S41, sending to said data source 10 a message for adjusting a data transmission rate of said data source 10, said message indicating as an upper bound for said data transmission rate a value corresponding to a value associated with the minimum transmission capacity parameter for the transport service provided to terminal 16 by network 2. For example, the message can signal that the upper bound is the GBR value assigned to the bearer in network 2 that carries the data for receiver 17 to terminal 16.

Figure 5:
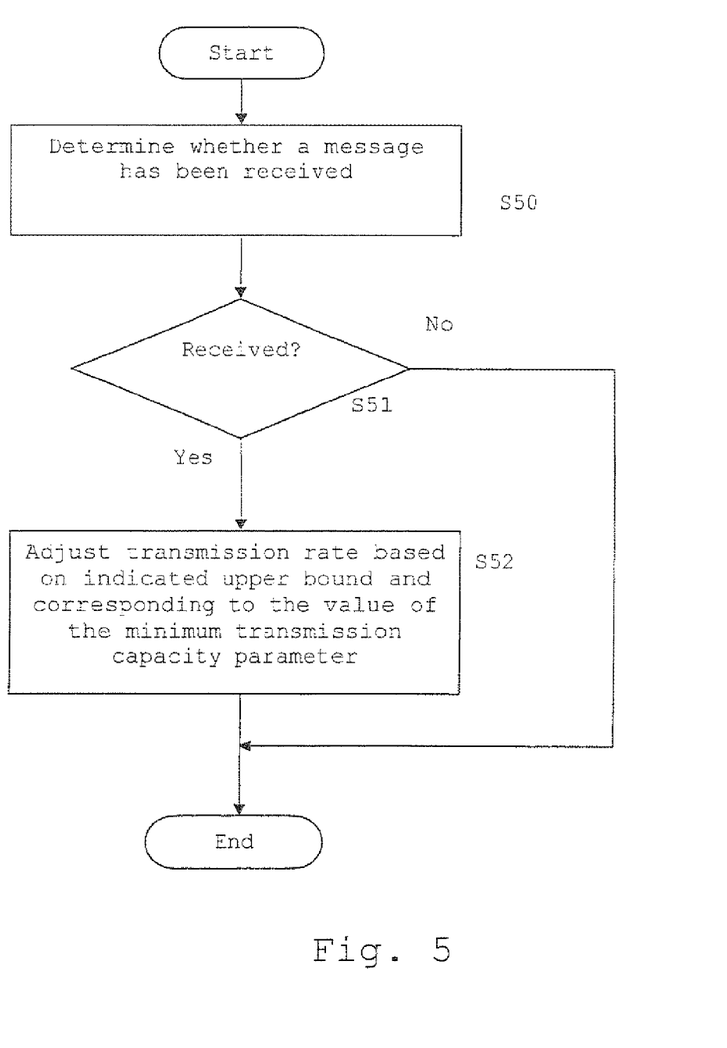
FIG. 5 shows a flowchart of another method embodiment of the invention.

Similar to the case of the receiver, the data source and corresponding control method are also preferably adapted to take into account a minimum transmission capacity offered by the network to the data source. FIG. 5 shows a corresponding method for controlling a data source 10 shown in FIG. 1. The method of controlling the data source 10 of the data unit communication 18 to receiver 17 comprises determining whether a message for adjusting a data transmission rate of said data source 10 has been received from said receiver 17, step S50, if said message is received, step S51, adjusting the transmission rate of said data source 10 based on an upper bound for said data transmission rate indicated in said message, and based on a value corresponding to a value associated with the minimum transmission capacity parameter for the transport service provided by network 1 to terminal 11.

The data source 10 can take into account not only the upper bound for the sending rate communicated in the message, but also the value of the minimum transmission capacity parameter associated with the transport service offered to its own terminal 11. For example, if the minimum transmission capacity is a guaranteed bit rate (GBR), then the message can indicate the guaranteed bit rate value offered to the receiver (i.e. to terminal 16 by network 2), and the data source 10 can then reduce its sending rate to the lower value out of the guaranteed bit rate value offered the data source 10 by network 1 and the guaranteed bit rate offered to the receiver 17 by network 2.

The above described methods can also be embodied as software comprising computer program code parts arranged to perform the method steps when executed on a communication device that can act as data source/receiver and comprises a terminal (e.g. a mobile telephone), and as a computer program product carrying such a computer program, e.g. a data carrier. Furthermore, the invention also can be embodied as a communication device that is controllable to act as a receiver (like element 17 of FIG. 1) of a data unit communication from a data source and comprising a terminal of a data unit communication network providing said terminal with a transport service characterized by a set of values associated with respective service quality parameters, said service quality parameters comprising a minimum transmission capacity parameter, said communication device comprising a control element (e.g. a programmable processor) arranged for determining whether a received data unit contains a congestion indication marking, and if said congestion indication marking is detected, for sending to said data source a message for adjusting a data transmission rate of said data source, said message indicating as an upper bound for said data transmission rate a value corresponding to a value associated with the minimum transmission capacity parameter for said transport service.

The invention can also be embodied as a communication device that is controllable to act as a data source (like element 10 of FIG. 1) of a data unit communication to a receiver, comprising a terminal of a data unit communication network providing said terminal with a transport service characterized by a set of values associated with respective service quality parameters, said service quality parameters comprising a minimum transmission capacity parameter, said communication device comprising a control element (e.g. a programmable processor) arranged for determining whether a message for adjusting a data transmission rate of said data source has been received from said receiver, and if said message is received, for adjusting the transmission rate of said data source based on an upper bound for said data transmission rate indicated in said message and a value corresponding to a value associated with the minimum transmission capacity parameter for said transport service.

Figure 8:
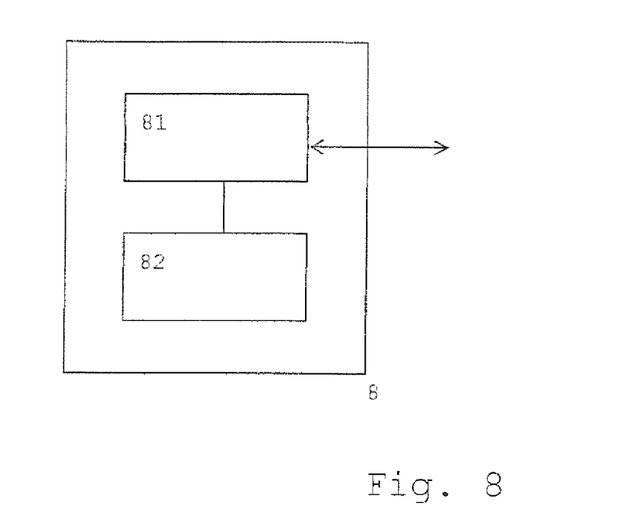
FIG. 8 shows a schematic representation of a communication device comprising a terminal.

FIG. 8 shows a schematic example of a communication device 8 acting as a data source or a receiver, where 81 represents a buffer for data units and 82 represents a processor appropriately programmed to implement the above methods. Further known elements of communication devices are not shown for simplicity.

Figure 6:
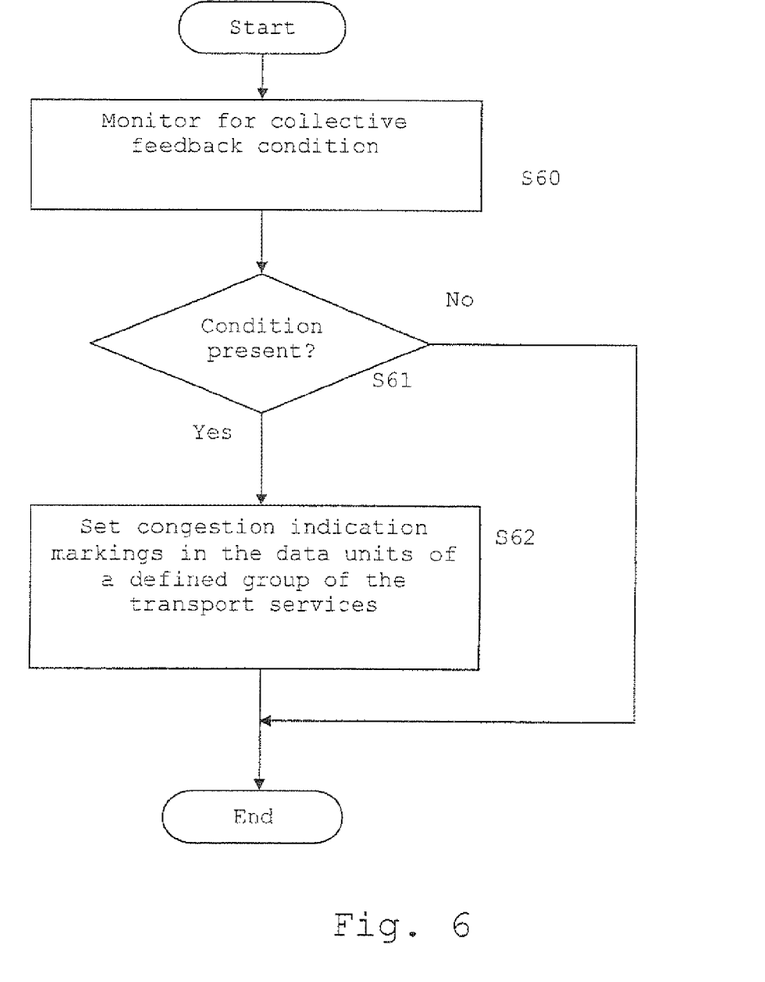
FIG. 6 shows a flowchart of another method embodiment of the invention.

FIG. 6 shows a further embodiment of a method for controlling a network entity, such as one of entities 12 to 15 shown in FIG. 1. The network entity is involved in providing respective transport services to a plurality of terminals of said data unit communication network, and each transport service is characterized by a set of values associated with respective service quality parameters. The method comprises monitoring for a presence of a collective feedback condition, step S60, and if the presence of said collective feedback condition is determined, step S61, setting a congestion indication marking in data units of a defined group of said transport services, step S62.

The collective feedback condition can be chosen in any suitable or desirable way. For example, if the data unit communication network is a cellular network, the presence of a collective feedback condition can be determined if a cell-level congestion condition is detected. Alternatively or additionally, the presence of a collective feedback condition can also be determined if a transport network level congestion condition is detected.

By setting the congestion indication marking, a control procedure as outlined above in connection with FIGS. 4 and 5 will lead to a sending rate reduction in all of the data sources using the transport services of the affected group. As a consequence, the method of FIG. 6 is a means with which a network operator can quickly reduce load if a number of transport services are utilizing more transmission capacity than their minimum transmission capacity value setting. This can e.g. be the case if a maximum transmission capacity parameter value (e.g. a Maximum Bit Rate) is assigned that is larger than the value of the minimum transmission capacity parameter (e.g. a Guaranteed Bit Rate). Then the individual transport services may utilize non-guaranteed bandwidth that exceeds the minimum transmission capacity of each transport service. With the help of the above described concept, a network operator can control the network to collectively reduce the utilization of the transport services in the defined group to the values of the minimum transmission capacity parameter. In this way, a large amount of bandwidth can be made free with a simple procedure, but in a controlled manner that allows the rate adaptive data sources to reduce their sending rates in a controlled way, i.e. without unexpected quality degradation.

Preferably, the network entity for the method of FIG. 6 is a radio access network entity.

The affected group can be defined in any suitable or desirable way. For example, the group can be defined by all transport services that said network entity is involved in providing. If the network entity is a radio access network entity and responsible for a cell of a cellular network, then e.g. all transport services (e.g. bearers) of that cell could be controlled as described above, i.e. that the data sources associated with those bearers reduce their rates.

Preferably, the group is defined on the basis of values of one or more service quality parameters. For example, if the service quality parameters comprise a parameter that indicates a minimum transmission capacity (e.g. GBR), then the group can be defined as all those transport services (e.g. bearers) for which a current data rate exceeds a value corresponding to the value of said minimum transmission capacity parameter.

Then group can also be defined on the basis of respective ranges of values of one or more of said service quality parameters. For example, if the service quality parameters comprise a Label and an Allocation and Retention Priority, then the group can be defined based on a range of values of said Label and/or a range of values of said Allocation and Retention Priority.

The above described methods of FIG. 6 can also be embodied as software comprising computer program code parts arranged to perform the method steps when executed on a network entity, and as a computer program product carrying such a computer program, e.g. a data carrier. Furthermore, the invention also can be embodied as a network entity for a data unit communication network, said network entity being arranged to be involved in providing respective transport services to a plurality of terminals of said data unit communication network, each transport service being characterized by a set of values associated with respective service quality parameters, said network entity comprising a control element (e.g. a programmable processor) arranged for monitoring for a presence of a collective feedback condition, and if the presence of said collective feedback condition is determined, for setting a congestion indication marking in data units of a defined group of said transport services. FIG. 7 shows an example of such network entity.

The invention claimed is:

1. A method for controlling a receiver of a data unit communication from a data source, said receiver being associated with a first terminal of a data unit communication network providing said first terminal with a transport service characterized by a set of values associated with respective service quality parameters, said service quality parameters comprising a Guaranteed Bit Rate (GBR), said data source being associated with a second terminal, said method comprising:
   determining, by the receiver, whether a received data unit contains an Explicit Congestion Notification (ECN),
   if said ECN is detected, sending, from the receiver, to said data source a message for adjusting a data transmission rate of said data source, said message indicating as an upper bound for said data transmission rate a value corresponding to a value associated with the GBR for said first transport service.

2. The method of claim 1, wherein the data units comprise video data.

3. The method of claim 1, wherein the data units comprise speech data.

4. The method of claim 1, wherein the data units comprise IP packets and said ECN is in an IP header of said data units.

5. A method of controlling a data source of a data unit communication to a receiver, said receiver being associated with a first terminal of a data unit communication network providing said first terminal with a first transport service characterized by a first set of values associated with respective first service quality parameters, said first service quality parameters comprising a first Guaranteed Bit Rate (GBR), said data source being associated with a second terminal of a data unit communication network providing said second terminal with a second transport service characterized by a second set of values associated with respective second service quality parameters, said second service quality parameters comprising a second GBR, said method comprising:
   determining whether a message for adjusting a data transmission rate of said data source has been received from said receiver,
   if said message is received, adjusting the transmission rate of said data source based on an upper bound for said data transmission rate indicated in said message, the upper bound corresponding to a value associated with the first GBR, and based on a value corresponding to a value associated with the second GBR for said transport service provided to said second terminal associated with said data source.

6. The method of claim 5, wherein the data units comprise video data.

7. The method of claim 5, wherein the data units comprise speech data.

8. A communication device that is controlled to act as a receiver of a data unit communication from a data source and comprising a first terminal of a data unit communication network providing said first terminal with a transport service comprising a set of values associated with respective service quality parameters, said service quality parameters comprising a Guaranteed Bit Rate (GBR), said data source being associated with a second terminal said communication device comprising:
   a processor; and
   a memory, said memory containing instructions executable by said processor, whereby said communication device is operative to:
      determine whether a received data unit contains an Explicit Congestion Notification (ECN), and
      if said ECN is detected, send to said data source a message for adjusting a data transmission rate of said data source, said message indicating as an upper bound for said data transmission rate a value corresponding to a value associated with the GBR for said first transport service provided to said first terminal associated with said receiver.

9. The communication device of claim 8, wherein the data units comprise video data.

10. The communication device of claim 8, wherein the data units comprise speech data.

11. The communication device of claim 8, wherein the data units comprise IP packets and said ECN is in an IP header of said data units.

12. A communication device that is controlled to act as a data source of a data unit communication to a receiver, comprising a second terminal of a data unit communication network providing said second terminal with a transport service comprising a set of values associated with respective service quality parameters, said service quality parameters comprising a second Guaranteed Bit Rate (GBR), said receiver being associated with a first terminal of a data unit communication network providing said first terminal with a first transport service characterized by a first set of values associated with respective first service quality parameters, said first service quality parameters comprising a first GBR, said communication device comprising:
   a processor; and
   a memory, said memory containing instructions executable by said processor, whereby said communication device is operative to:
      determine whether a message for adjusting a data transmission rate of said data source has been received from said receiver, and
      if said message is received, adjust the transmission rate of said data source based on an upper bound for said data transmission rate indicated in said message, the upper bound corresponding to a value associated with the first GBR, and based on a value corresponding to a value associated with the second GBR for said transport service provided to said second terminal associated with said data source.

13. The communication device of claim 12, wherein the data units comprise video data.

14. The communication device of claim 12, wherein the data units comprise speech data.

* * * * *

UNITED STATES PATENT AND TRADEMARK OFFICE
CERTIFICATE OF CORRECTION

PATENT NO. : 9,602,234 B2  
APPLICATION NO. : 14/679279  
DATED : March 21, 2017  
INVENTOR(S) : Ludwig et al.

Page 1 of 1

It is certified that error appears in the above-identified patent and that said Letters Patent is hereby corrected as shown below:

On the Title Page

Item (72), under "Inventors", in Column 1, Line 1, delete "Renier" and insert -- Reiner --, therefor.

Item (72), under "Inventors", in Column 1, Line 3, delete "Lulea" and insert -- Luleå --, therefor.

In the Specification

In Column 1, Line 5, delete "of pending" and insert -- of --, therefor.

In Column 1, Line 6, delete "2010," and insert -- 2010, now Pat. No. 9,025,453, --, therefor.

In Column 1, Line 8, delete "2010," and insert -- 2010, now Pat. No. 8,787,156, --, therefor.

In Column 1, Line 63, delete "example" and insert -- example, --, therefor.

In Column 5, Line 46, delete "form" and insert -- from --, therefor.

In Column 6, Line 54, delete "terminal 17." and insert -- terminal 16. --, therefor.

In Column 7, Line 4, delete "terminal 12" and insert -- terminal 11 --, therefor.

In the Claims

In Column 12, Line 6, in Claim 8, delete "terminal" and insert -- terminal, --, therefor.

Signed and Sealed this  
Sixth Day of June, 2017

Michelle K. Lee  
*Director of the United States Patent and Trademark Office*